UNITED STATES PATENT OFFICE.

R. GOLDENBLUM AND F. STEINER, OF EAST HAMPTON, MASSACHUSETTS.

IMPROVEMENT IN COMPOSITIONS FOR WATERPROOFING LEATHER.

Specification forming part of Letters Patent No. 31,453, dated February 19, 1861.

*To all whom it may concern:*

Be it known that we, R. GOLDENBLUM and F. STEINER, both of East Hampton, in the county of Hampshire and State of Massachusetts, have invented a new and Improved Composition for Making Leather Water-Proof; and we do hereby declare that the following is a full, clear, and exact description of the same.

The object of this invention is to produce a composition which, when applied to leather, will preserve the same, and at the same time make it perfectly impervious for water.

To enable those skilled in the art to fully understand our invention, we will proceed to describe it.

The ingredients from which our composition is made are fish-oil, india-rubber dissolved in spirits of turpentine, petroleum or liquid naphtha, rosin, pitch, beeswax, tallow, soap, and lard. The proportion in which we mix these ingredients is as follows: fish-oil, four ounces; india-rubber dissolved in spirits of turpentine, one-half ounce; petroleum, one ounce; rosin, one ounce; pitch, one ounce; beeswax, one ounce; tallow, two ounces; common soap, four ounces; lard, two ounces. These ingredients are mixed together under a gentle heat, and they form into a glutinous paste, the consistency of which may be varied by slightly changing the proportion between the fluid and the solid ingredients. The petroleum or naphtha serves to dissolve the rosin and the pitch and to keep them in a semi-fluid state, the beeswax, the lard, and the tallow are rendered fluid by the fish-oil, and the whole is intimately combined by the soap, which also gives to our composition the property to adhere readily to the leather to which it may be applied. Without the soap, the composition, when applied to the leather, is liable to come off in a short time, or to crack as soon as it becomes dry, whereas when the soap is added the composition forms on the surface of the leather a thin stratum equal in consistency and toughness to the leather itself, and perfectly impervious for water. The fatty substances mixed with it render the leather pliable and soft.

This composition may be applied either cold with a rag or slightly heated with a brush, and it is equally applicable to the upper-leather of boots and shoes, and to the soles.

Having thus described our invention, what we claim as new, and desire to secure by Letters Patent, is—

The composition made of fish-oil, india-rubber dissolved in spirits of turpentine, petroleum, rosin, pitch, beeswax, tallow, common soap, and lard, as herein described.

R. GOLDENBLUM.
F. STEINER.

Witnesses:
J. STATZENBERG,
L. PRESTON.